(12) United States Patent
Ikeda

(10) Patent No.: US 8,527,984 B2
(45) Date of Patent: Sep. 3, 2013

(54) APPLICATION PLATFORM AND APPLICATION

(75) Inventor: Motoki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/605,239

(22) Filed: Oct. 23, 2009

(65) Prior Publication Data

US 2010/0122247 A1  May 13, 2010

(30) Foreign Application Priority Data

Nov. 12, 2008  (JP) ................................. 2008-289887

(51) Int. Cl.
- G06F 9/445 (2006.01)
- G06F 12/00 (2006.01)
- G06F 17/30 (2006.01)
- G06F 9/46 (2006.01)

(52) U.S. Cl.
USPC ............................ 717/174; 707/813; 718/104

(58) Field of Classification Search
USPC ........................ 717/174; 707/813; 718/104
See application file for complete search history.

(56) References Cited

U.S. PATENT DOCUMENTS

| | | | |
|---|---|---|---|
| 5,948,065 A * | 9/1999 | Eilert et al. | 709/226 |
| 7,469,285 B2 * | 12/2008 | Poortman | 709/223 |
| 7,693,995 B2 * | 4/2010 | Kudo et al. | 709/226 |
| 7,702,779 B1 * | 4/2010 | Gupta et al. | 709/224 |
| 7,996,846 B2 * | 8/2011 | McCarthy et al. | 718/104 |
| 2003/0217065 A1 | 11/2003 | Yokota | |
| 2006/0053113 A1 * | 3/2006 | Hentschel | 707/10 |

FOREIGN PATENT DOCUMENTS

| | | |
|---|---|---|
| JP | 2000-305756 A | 11/2000 |
| JP | 2004-5419 A | 8/2004 |

OTHER PUBLICATIONS

Japanese Office Action dated Dec. 25, 2012 issued in corresponding Japanese Patent Application No. 2008-289887.

* cited by examiner

*Primary Examiner* — Henry Tsai
*Assistant Examiner* — Eric Oberly
(74) *Attorney, Agent, or Firm* — Fitzpatrick, Cella, Harper & Scinto (57) ABSTRACT

The problem of the present invention is to be capable of efficiently using a system resource of a device. For solving the above problem, an application platform according to the present invention comprises determining unit for determining whether an application for installation or activation is installed or activated, wherein when the determining unit determines whether the application for installation or activation is installed or activated, the determining unit refers to a first resource use amount and a second resource use amount larger than the first resource use amount of each of a plurality of applications already installed or activated, a first resource use amount and a second resource use amount larger than the first resource use amount of the application for installation or activation.

3 Claims, 8 Drawing Sheets

| APPLICATION NAME | APPLICATION ID | STATE | MAXIMUM MEMORY USE AMOUNT | MINIMUM MEMORY USE AMOUNT |
|---|---|---|---|---|
| COPY | XXXXXXX001 | ACTIVATE | 8000KB | 500KB |
| DOCUMENT MANAGEMENT | XXXXXXX002 | ACTIVATE | 6000KB | 700KB |
| FUNCTION INTRODUCTION | XXXXXXX003 | STOP | 2000KB | 500KB |
| SEND/FAX | XXXXXXX004 | ACTIVATE | 6500KB | 3000KB |

APPLICATION PLATFORM AND APPLICATION

BACKGROUND OF THE INVENTION

1. Field of the Invention

The present invention relates to an application platform for managing an application and an application.

2. Description of the Related Art

There is conventionally proposed a device (for example, a Multi-Function Peripheral (MFP)) capable of installing or activating an application or uninstalling the application. A device vender or a vender of a third part affiliated with the device vender sells various applications. A user purchases and installs or activates a desired application out of these applications, thereby making it possible to make use of the MFP at a mode matching for an individual user's need more appropriately.

Incidentally, since costs are minimized in designing a device, system resources (resource) such as memory devices are not affluently prepared. Therefore, there is proposed a technology where in a case of installing or activating an application, it is checked whether or not a system resource required for the application to correctly operate is ensured to prevent drawbacks or erroneous operations of the device (Japanese Patent Laid-Open No. 2004-5419).

In the aforementioned conventional technology, in a case where a capacity of a memory required for the application to operate is analyzed at the time of installing or activating the application in the device and the device can not provide a memory having such capacity, the application is not installed or activated in the device. Here, the capacity of the memory required for the application to operate is in general the maximum amount of a resource use amount of a resource (for example, memory) consumed by the application (maximum memory use amount). That is, the maximum use amount may be the maximum amount of the memory used by the application.

Herein, a sum of maximum memory use amounts of the respective applications amounts to a huge amount and quickly results in exceeding the resource (for example, memory capacity) in the device. Therefore, the number of the applications which can be installed or activated in the device is limited to a small number.

An objective of the present invention is to solve the above problem.

For increasing the number of the applications which can be installed or activated in the device, attention can be paid on a point where all of the applications installed or activated do not use the maximum memory use amount with each other simultaneously. That is, in most cases a part of the applications uses the resource only by a used amount remarkably smaller that the maximum memory use amount.

For example, the application selected and used by a user usually uses the maximum memory use amount. On the other hand, the application which is not selected or used by the user does not use the maximum memory use amount.

That is, an operation of the application consumes much more memories at the time of displaying GUI to a user, executing a process in a device or receiving and processing a change in state of the process executed by the device.

For example, a user operates an application for a copy with a touch panel in a MFP to perform setting an indication of finish, a feeding stage or the like. In this case the application of the copy displays various pieces of information such as a drawing illustrating an output image, a drawing illustrating an outside appearance of a MFP for showing a position of a feeding stage or a display component such as a button or a list. A recent device is designed to increase a size of a display unit or be affluent with display contents for improvement on usability or improvement on attraction of the device. A greater number of memories are generally required for a display of GUI in the conventional device. In addition to it, nowadays a device is designed to increase a size of a display unit or be affluent with display contents for improvement on usability or improvement on attraction of the device, and therefore, a memory amount to be consumed has been further increasing.

In addition, in the processes of copying or production and transmission of a document in a MFP, the application operates variously in accordance with states of such processes (jobs). At this time, the application is in a state of consuming many memories for storing temporary data. In this way, the application selected and used by a user uses the maximum memory use amount.

However, the application which is not operated by a user does not need a display of GUI corresponding thereto. In addition, the process by a change in state of a device or by the device is not always executed. Therefore, the application which is not selected or used by the user does not use a memory with the maximum memory use amount.

SUMMARY OF THE INVENTION

For solving the above problem, an application platform according to the present invention comprises determining unit for determining whether an application for installation or activation is installed or activated, wherein when the determining unit determines whether the application for installation or activation is installed or activated, the determining unit refers to a first resource use amount and a second resource use amount larger than the first resource use amount of each of a plurality of applications already installed or activated, a first resource use amount and a second resource use amount larger than the first resource use amount of the application for installation or activation.

According to the present invention, the system resource of the device can be efficiently used.

Further features of the present invention will become apparent from the following description of exemplary embodiments with reference to the attached drawings.

DESCRIPTION OF THE EMBODIMENTS

Hereinafter, the best mode of carrying out the present invention will be explained with reference to the accompanying drawings.

First Embodiment

Figure 1:
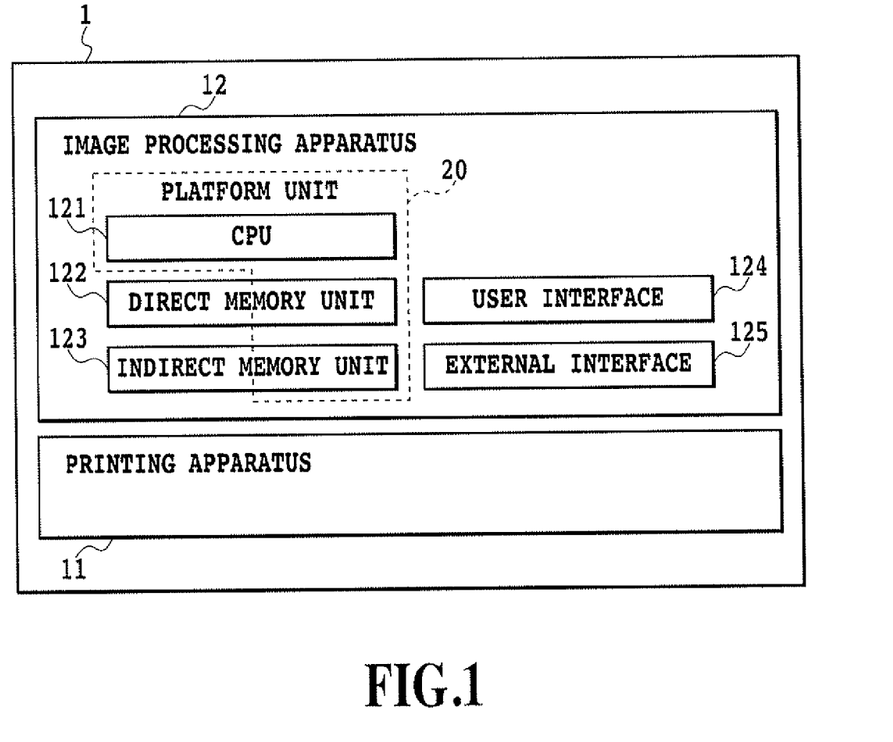
FIG. 1 is a diagram showing an image forming apparatus.

FIG. 1 is a diagram showing an outline of an image forming apparatus as an example of a device in which an application platform according to the present invention is installed.

(Explanation of Image Forming Apparatus 1)

An image forming apparatus 1 includes a printing apparatus 11 and an image processing apparatus 12.

The image processing apparatus 12 includes a CPU 121, a direct memory unit 122 (for example, RAM), an indirect memory unit 123 (for example, HDD), a user interface 124 and an external interface 125.

The direct memory unit 122 is a memory unit which directly receives and outputs data from and to the CPU 121 and the indirect memory unit 123 is a memory unit which receives and outputs data from and to the CPU 121 through the direct memory unit 122. The direct memory unit 122 stores various applications and platform programs. The direct memory unit 122 temporarily stores information obtained when a platform unit 20 executes an application.

The user interface 124 includes a touch panel, a key board, a mouse, a display and the like and can display data (GUI data) based upon an instruction from a user.

The external interface 125 can receive data from an external apparatus and transmit data to the external apparatus. For example, the external apparatus includes an external memory apparatus such as an external HDD or an external USB memory and a separate apparatus such as a separate host computer or an image forming apparatus connected through a network.

In the present embodiment, an image forming process or a printing process executed by the printing apparatus 11 or the image processing apparatus 12 is called a job.

(Explanation of Platform Unit 20)

The CPU 121 can move (store) platform programs stored in the indirect memory unit 123 to the direct memory unit 122. When the movement is completed, the CPU 121 is in a state of being capable of executing the platform program. In the present embodiment, an event that the CPU 121 is in a state of being capable of executing the platform program is called an event that the platform unit 20 activates. The platform unit 20 after being activated may be called an application platform in the present embodiment.

The platform unit 20 detects a state of each unit in the image forming apparatus and a state of a job performed by the printing apparatus 11 or the image processing apparatus 12, thereby executing an application to be described later.

In the present embodiment, the platform unit 20 may have the CPU 121. In addition, the platform unit 20 may have a region in the direct memory unit 122 for storing platform programs. The platform unit 20 may have a region (in the direct memory unit 122 and the indirect memory unit 123) for storing information (calculation result or the like) obtained at the time the CPU 121 processes the platform program.

(Explanation of Application Program)

The platform unit 20 receives a first application program through the external interface 125, which can be stored in the indirect memory unit 123 (inside the platform unit 20). As described later, the platform unit 20 adds information specifying the application program which has been stored in the indirect memory unit 123 to management information. In the present embodiment, this matter (the storing of the application program and the addition of information specifying the application program to the management information) is called installation of the first application program to the platform unit 20. In the present embodiment, the application program after installed is called an application.

The platform unit 20 can move (store) the first application program stored in the indirect memory unit 123 to the direct memory unit 122. When the movement is completed, the platform unit 20 is in a state of being capable of executing the first application program. In the present embodiment, an event that the platform unit 20 is in a state of being capable of executing the first application program is called an event that the platform unit 20 activates the first application program.

In reverse, the platform unit 20 can delete the first application program stored in the direct memory unit 122 from the direct memory unit 122. In the present embodiment, this deletion is called an event that the platform unit 20 stops the first application.

In reverse, the platform unit 20 can delete the first application program stored in the indirect memory unit 123 from the indirect memory unit 123 and can further delete information specifying the first application from the above management information. In the present embodiment, this is called an event that the platform unit 20 uninstalls the first application.

In a case where in the present embodiment, the first application is activating at the time the platform unit 20 uninstalls the first application, the first application is uninstalled after stopping the activation of the first application.

In addition, an event that the platform unit 20 executes process steps provided in the first application one by one is called an event that the platform unit 20 executes the first application.

The above explanation is made using the first application program as an example, but it is apparent for persons skilled in the art that the same can be applied even to the other application program (for example, the second application program).

(Explanation of User Interface)

Figure 2:
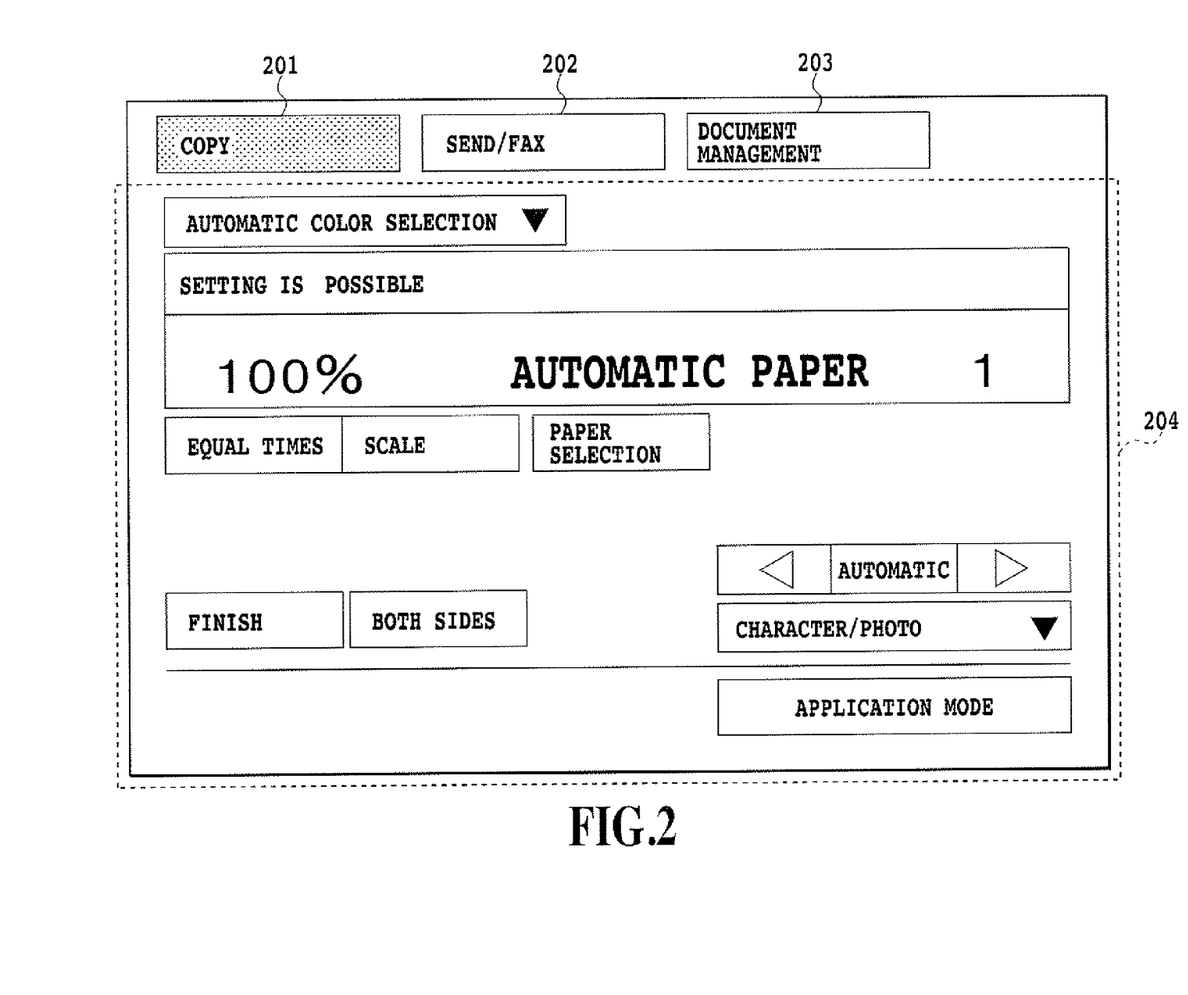
FIG. 2 is a diagram showing a display example of a user interface.

FIG. 2 is a diagram showing a display example of the user interface 124.

The platform unit 20 activates and executes a plurality of applications. As a result, GUI data are generated. The user interface 124 displays the GUI data of only one application at a time. Herein, an expression of "only one application at a time" is a modifier to an application and is not a modifier to the GUI data. In general, a display of the image forming apparatus as an object in the present embodiment has a tendency of increasing in size, but is smaller in size as compared to a PC for reducing the cost to be low. By displaying only the GUI data of only one application at a time, more of necessary information can be simultaneously displayed to a user who uses the application.

When a user instructs through the user interface 124 a tab 201, a tab 202 and a tab 203, the user interface 124 informs the platform unit 20 of this instruction. The platform unit 20 switches an application displaying the GUI data. In addition, the platform unit 20 informs the user interface 124 in such a manner as to display default GUI data in the switched application. For example, in FIG. 2, the GUI data in a copy application are displayed. When the tab 202 is instructed by a user through the user interface 124 in this state, the GUI data of a SEND/FAX application are displayed.

It should be noted that in a case where the platform unit 20 informs the user interface 124 so as to display the GUI data, the following process may be executed. That is, the platform unit 20 may in advance execute the application in the middle of activation, taking out the GUI data included in the application. In the present embodiment, the application as a source of taking out the GUI data is called an application displaying the GUI data.

A region 204 is a region for displaying GUI data generated as a result of executing the application by the platform unit 20.

In the present embodiment, the application in which the user interface 124 displays the GUI data is called "an active application". In reverse, the application in which the user interface 124 does not display the GUI data is called "a non-active application".

(Explanation of Management Information of Application)

Figure 3:
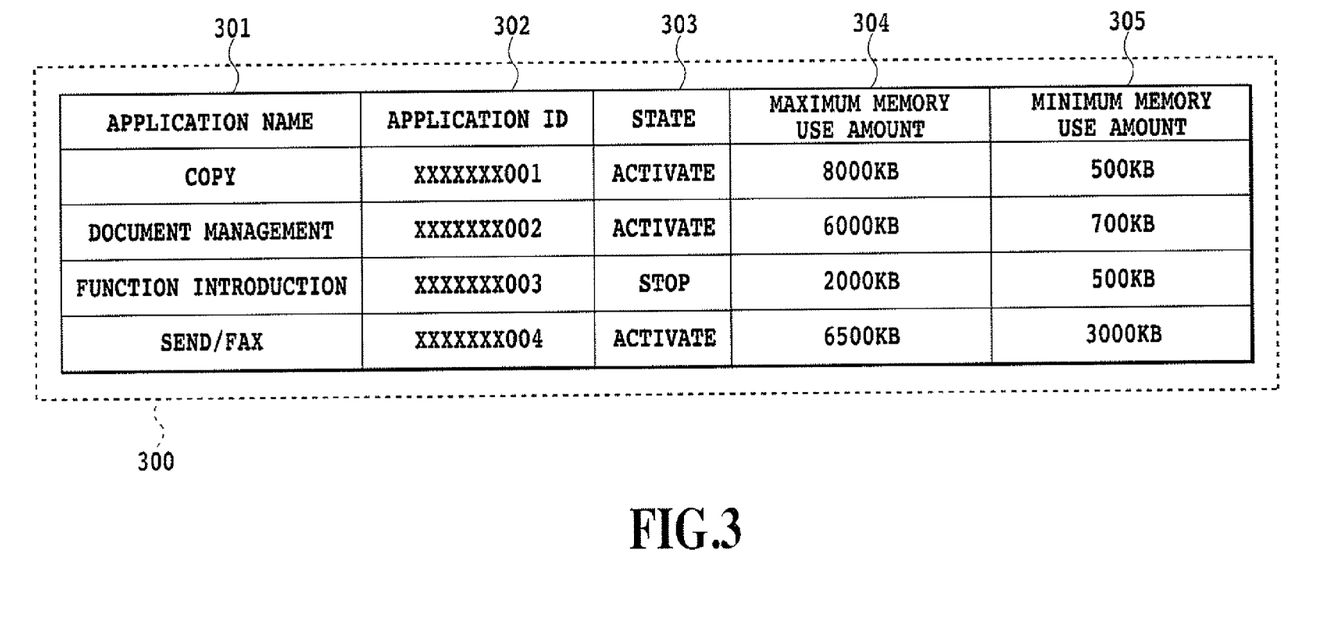
FIG. 3 is a diagram showing management information of an application.

FIG. 3 is a diagram showing the management information of an application.

Application management data 300 are stored in and managed by the platform unit 20.

In FIG. 3, data items 301 are data items each showing a name of an application. Data items 302 are data items each showing ID of an application and are respectively unique in an application management data 300. Data items 303 are data items each showing a state of an application. The data item 303 can be either one of "activate" and "stop" as a value. In a case where the platform unit 20 is in the middle of activating the application, the data item 303 is "activate". In a case where the platform unit 20 is in the middle of stopping the application, the data item 303 is "stop".

In FIG. 3, data items 304 are items each showing the maximum memory use amount of an application (the maximum amount of a resource use amount of a resource (for example, memory) consumed by the application). The maximum memory use amount is the maximum value among capacities (capacities in the direct memory unit 122) used when the platform unit 20 executes the active application in the middle of activation.

In FIG. 3, data items 305 are items each showing the minimum memory use amount of an application. The minimum memory use amount is the maximum value among capacities (capacities in the direct memory unit 122) used when the platform unit 20 executes the non-active application in the middle of activation. That is, the minimum memory use amount may be the memory use amount at a minimum required in a state where the application is not operated by a user.

One line in the application management data 300 in FIG. 3 is called a record. The record comprises the data item 301, the data item 302, the data item 303, the data item 304, and the data item 305. The record represents the management information of one application.

The platform unit 20 adds the record to the management information (application management data 300) in the middle of installing an application. The record includes the data items 301 to 305. The data item 301 is information specifying the application. Therefore, as described above, the platform unit 20 is to add the information specifying the application to the management information during this state (in the middle of the installing). In the record immediately after added, the data item 303 is "stop". During the installing, the platform unit 20 generates ID of a new application and inputs the ID to the data item 302 in the added record. The platform unit 20 generates the ID in such a manner as not to overlap with the data item 302 in the other record in the application management data 300.

The platform unit 20 receives an application program, as well as a name, a maximum memory use amount and a minimum memory use amount of the application through the external interface 125. The received name is input to the data item 301, the received maximum memory use amount is input to the data item 304 and the received minimum memory use amount is input to the data item 305. The input of these pieces of information is also included in the installation in the present embodiment.

The platform unit 20, at the time of uninstalling the application, deletes the corresponding record in the application management data 300.

The platform unit 20, at the time of activating or stopping the application, updates the data item 303 to "activate" or "stop".

(Explanation of Maximum Memory Use Amount and Minimum Memory Use Amount)

Hereinafter, the maximum memory use amount and the minimum memory use amount declared in an application will be explained.

When a user instructs execution of an application in the user interface 124, the platform unit 20 executes the application. As a result, many GUI data are generated to consume the direct memory unit 122 by a large margin. An amount in which a consumption amount of the direct memory unit 122 in such a case becomes a maximum value is the maximum memory use amount. The maximum memory use amount is composed of a region for storing an application itself, a region for displaying GUI data and an execution region of an application (region for storing temporary data variously generated by executing an application).

As described above, the GUI data generated by executing the active application are displayed using a large part of the display region in the user interface 124. Therefore, the GUI data in the non-active application are not displayed in the user interface 124. In consequence, the platform unit 20 does not execute the non-active application according to the execution instruction from a user. Accordingly it is not necessary to ensure the execution region of the application in the direct memory unit 122. In addition, the platform unit 20 does not need to ensure the region for displaying the GUI data in the direct memory unit 122. Therefore, in a case where the application is non-active, an amount of the region in the direct memory unit 122 to be ensured for the application is small. The minimum memory use amount is a consumption amount of the direct memory unit 122 in a case where the application is non-active (that is, size of a region to be ensured for the non-active application), and an amount of the maximum value. The minimum memory use amount is composed of a region for storing the application itself.

In consequence, "the maximum memory use amount—the minimum memory use amount" theoretically corresponds to a sum of the execution region in the application to be ensured in the direct memory unit 122 and a GUI data display region in the application. However, in the present embodiment, a determination method of each of the memory use amounts will be hereinafter explained taking as examples not only a case of determining the two use amounts based upon this theoretical calculation, but also a case of determining them in an experiment. It should be noted that persons skilled in the art may possibly determine the two use amounts based upon this theoretical calculation. In general, the maximum memory use amount is larger than the minimum memory use amount.

The maximum memory use amount and the minimum memory use amount are determined by an experiment at a stage in development of an application.

In the stage of the development of an application, the application is made active and dummy data are stored in the direct memory unit 122. The application is executed by the platform unit 20. The image forming apparatus 1 gradually increases a capacity of the dummy data within a correctly operable range thereof to obtain the maximum value of the dummy data. A difference amount between the capacity of the direct memory unit 122 usable in the platform unit 20 and the maximum value of the dummy data is determined as the maximum memory use amount.

In addition, the application is made non-active to perform the similar job. In this case, a difference amount between the maximum value of the dummy data and the capacity of the direct memory unit 122 usable in the platform unit 20 is determined as the minimum memory use amount.

When the printing apparatus 11 or the image processing apparatus 12 performs the job, temporary data such as image data are generated. A capacity of the direct memory unit 122 required for storing the temporary data is not included in the maximum memory use amount or the minimum memory use amount in each application. That is, the region in common to each application is ensured in the direct memory unit 122.

(Explanation of Process at Installing)

Figure 4:
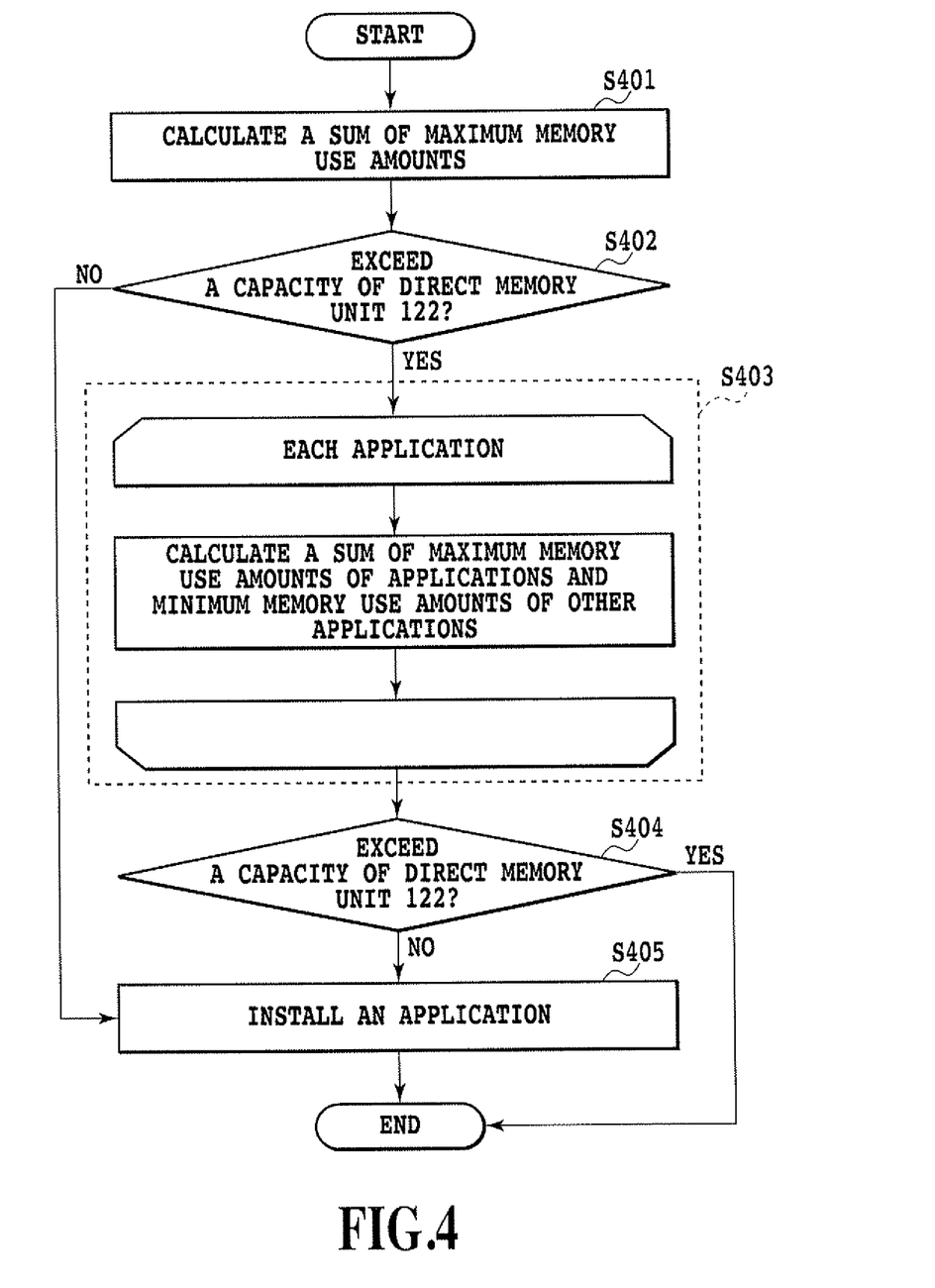
FIG. 4 is a flow chart showing the process order.

FIG. 4 is a flow chart showing the process order at the time the platform unit 20 installs an application program.

The external interface 125 receives and obtains an application program and a name, a maximum memory use amount and a minimum memory use amount of the application and informs the platform unit 20 of them. Thereby, the platform unit 20 executes the following process.

The platform unit 20 calculates a sum of a sum of the maximum memory use amounts of all the applications registered in the application management data 300 and the maximum memory use amount of an application as an installation target (S401). The number of all the applications registered in the application management data 300 is usually plural. The application as the installation target is an application generated by installing the application as the installation target.

The platform unit 20 determines whether or not the sum calculated at S401 exceeds the capacity of the direct memory unit 122 usable in the platform unit 20 (S402). When it is determined that the sum calculated at S401 exceeds the capacity of the direct memory unit 122 usable in the platform unit 20, the process goes to S403. On the other hand, when it is determined that the sum calculated at S401 does not exceed the capacity of the direct memory unit 122 usable in the platform unit 20, the process goes to S405. The platform unit 20 stores this determination result in the direct memory unit 122. Incidentally the capacity of the direct memory unit 122 usable in the platform unit 20 is a capacity found by subtracting the following (A) to (C) from the entire capacity of the direct memory unit 122.

(A): Region for storing the platform program (B): Region (in the direct memory unit 122 and the indirect memory unit 123) for storing information (calculation result or the like) obtained at the time the CPU 121 processes the platform program.

(C): Capacity of the direct memory unit 122 used at a maximum at the time the printing apparatus 11 and the image forming apparatus 12 operate The platform unit 20 calculates the following value to each of the application registered in the application management data 300 and the application as the installation target (S403). That is, the platform unit 20 calculates a sum of the maximum memory use amount of some application and the minimum memory use amount of an application other than the above application.

The platform unit 20 determines whether or not the maximum value among the sums calculated at S403 exceeds the capacity of the direct memory unit 122 (total memory amount) usable at the platform unit 20 (S404). Here, an application in which a difference between the maximum memory use amount and the minimum memory use amount is the largest is selected and a sum of the maximum memory use amount of the selected application and the minimum memory use amounts of the remaining applications may be defined as the sum calculated at S403.

For example, there exist the following applications 1 to 3. In this case, in the application 1, the maximum memory use amount is assumed as 10 and the minimum memory use amount is assumed as 0. In the application 2, the maximum memory use amount is assumed as 10 and the minimum memory use amount is assumed as 1. In the application 3, the maximum memory use amount is assumed as 10 and the minimum memory use amount is assumed as 9.

Then, a difference between the maximum memory use amount and the minimum memory use amount is 10−0=10, and the application 1 is selected as an application in which the difference between the maximum memory use amount and the minimum memory use amount is the largest. A sum calculated at S403 by addition of the maximum memory use amount (10) of the selected application and the minimum memory use amounts (1 and 9) of the remaining applications 2 and 3 is 10+1+9=20.

In a case where it is determined at S404 that the sum calculated at S403 exceeds the capacity of the direct memory unit 122 usable at the platform unit 20, the process ends without installing the application received by the external interface 125.

In a case where it is determined at S404 that the sum calculated at S403 does not exceed the capacity of the direct memory unit 122 usable at the platform unit 20, the process goes to S405.

The platform unit 20 installs the application program received through the external interface 125 (S405). The platform unit 20, as described above, adds the record to the application management data 300 at the time of installing the application program. The name, the maximum memory use amount, and the minimum memory use amount of the application are included in the data item 301, the data item 304, and the data item 305 in the added record.

In a case where it is determined at S402 that the sum calculated at S401 does not exceed the capacity of the direct memory unit 122 usable at the platform unit 20, the direct memory unit 122 has an additional capacity.

In a case where the direct memory unit 122 has the additional capacity, each of all the applications including the newly installed application can use the direct memory unit 122 by the maximum memory use amount respectively.

When the direct memory unit 122 has no additional capacity (it is determined at S402 that the sum calculated at S401 exceeds the capacity of the direct memory unit 122 usable at the platform unit 20), it is conventionally restricted to install a new application. In the present embodiment, however, the only one active application controls the direct memory unit 122 to be usable by the maximum memory use amount. Further, the other application controls the direct memory unit 122 to be usable by the minimum memory use amount. S404 is a process of determining whether or not a new application can be installed with such control.

(Explanation of Control of Application Platform)

Figure 5:
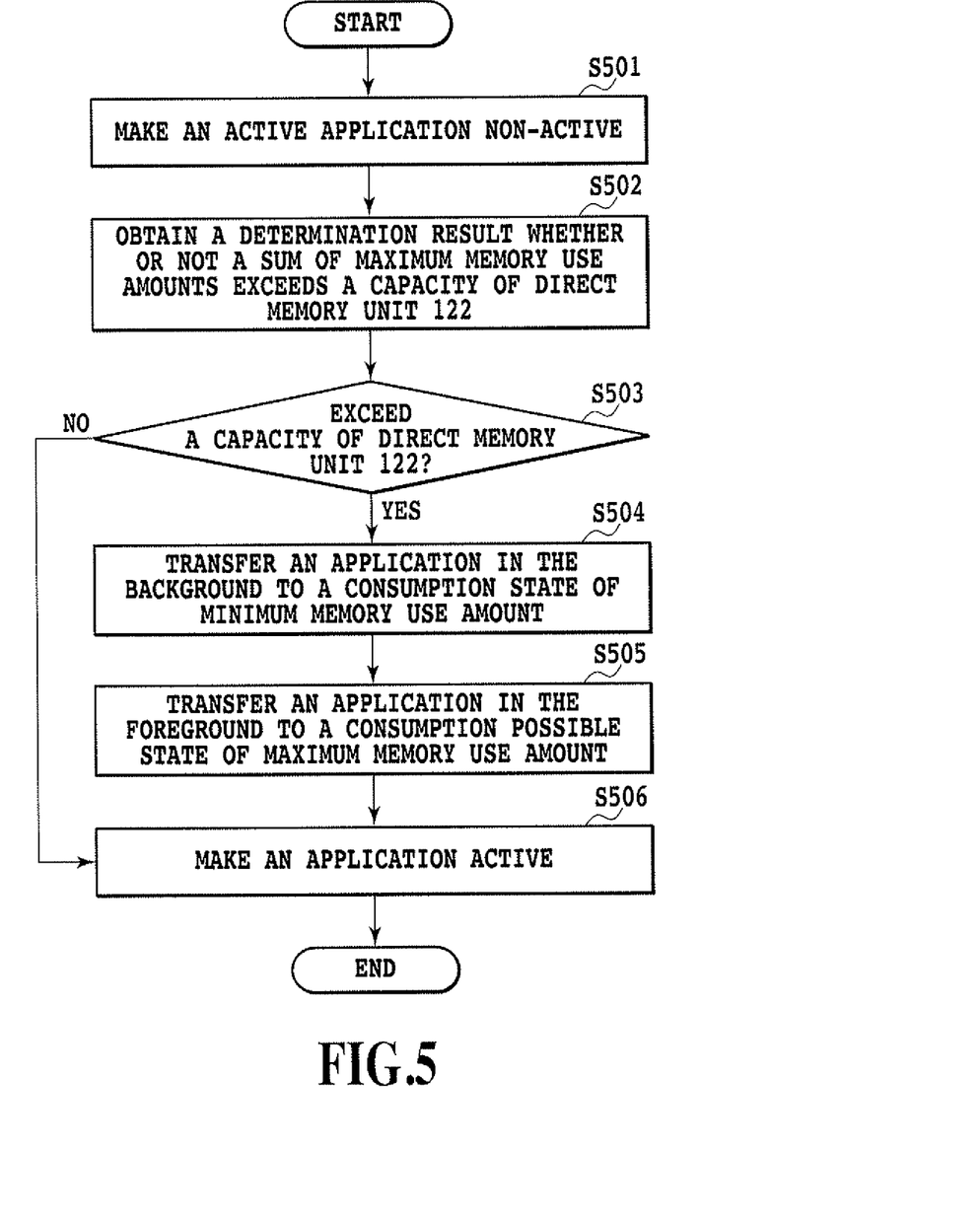
FIG. 5 is a flow chart showing the process order.

FIG. 5 is a flow chart showing the (application platform) process order of the platform unit 20 at the time of switching an active application in the present embodiment.

When the tab 201, the tab 202 or the tab 203 is instructed by a user, the user interface 124 informs the platform unit 20 of this instruction. When the platform unit 20 receives this notice, the following processes will be executed.

The platform unit 20 makes the present active application non-active (S501). The platform unit 20 informs the user interface 124 of stop of the display of the GUI data in the application which was active.

The platform unit 20 obtains the determination result on whether or not the sum stored in the direct memory unit 122 at S403 exceeds the capacity of the direct memory unit 122 usable at the platform unit 20 (S502).

When the platform unit 20 confirms the determination result (S503) to determine that the sum stored in the direct memory unit 122 at S403 exceeds the capacity of the direct memory unit 122 usable at the platform unit 20, the process goes to S504. On the other hand, the sum stored in the direct memory unit 122 at S403 does not exceed the capacity of the direct memory unit 122 usable at the platform unit 20, the process goes to S506.

The platform unit 20 transfers the application in the background which is made non-active at S501 to a state (consumption state of the minimum memory use amount) of consuming the direct memory unit 122 by the minimum memory use amount (S504). When the application is in a consumption state of the minimum memory use amount, the platform unit 20 does not execute the application even if the state of each unit in the image forming apparatus 1 or the state of the job changes. Further, the platform unit 20 deletes the execution region storing the GUI data and the temporary data in the application which has transferred to the consumption state of the minimum memory use amount.

The platform unit 20 transfers an application made associated with the tab (any one of the tab 201, the tab 202, and the tab 203) informed by the user interface 124 to a consumption possible state of the maximum memory use amount (S505). Here, the consumption possible state of the maximum memory use amount is a state of being capable of consuming the direct memory unit 122 by the maximum memory use amount. When the application is in a consumption possible state of the maximum memory use amount, in a case where a state of each unit or the job in the image forming apparatus 1 changes, the platform unit 20 executes the application in response to this change.

The platform unit 20 makes an application made associated with the tab (any one of the tab 201, the tab 202, and the tab 203) informed by the user interface 124 active (S506). Start of the display of the GUI data in the application which is made active is informed to the user interface 124.

In consequence, it is possible to reduce the minimum memory use amount of the application to a smaller capacity. A larger range in the region of the direct memory unit 122 usable at the platform unit 20 can be left, making it possible to install more applications therein.

The process at S404 is previously explained. This is the process where in a case where the direct memory unit 122 has no additional capacity, only the active application enables the direct memory unit 122 to be used by the maximum memory use amount, and thereby it is determined whether or not an application can be newly installed. Processes at S505 and S506 realize this control.

In a case of issuing a job, the platform unit 20 executes the application so that the job is required to be monitored and controlled. (for example, the platform unit 20 monitors whether or not the job normally proceeds or generates GUI data in a case of error completion). In a case of this state, it is preferable that the platform unit 20 is controlled not to execute the aforementioned process (switching of the application). In this case, the user interface 124 displays the tab 201, the tab 202, or the tab 203 in half-tone dot meshing (display in such a manner as to be incapable of instructing by reverse).

In this way, according to the present embodiment, the non-active application is controlled to a state in which the memory use amount is small. At the time of installing the application, in addition to the memory amount used at a maximum (the maximum memory use amount), the memory amount in a state where the memory use amount is small (minimum memory use amount) is referred to. Conventionally by referring to the sum (integrated value) of the maximum memory use amounts of all the applications only, installation of the application is restricted, but according to the present embodiment, more applications can be installed and operated.

In the present embodiment, it is explained that the capacity of the direct memory unit 122 required for storing the temporary data generated due to performing the job is not included in the maximum memory use amount or the minimum memory use amount of the application. However, the capacity required for storing the temporary data may be defined as the memory use amount of the application, that is, may be included in the maximum memory use amount or the minimum memory use amount of the application.

In a case of receiving a start instruction of a job from a user through the user interface 124, the platform unit 20 executes the application and issues the job to the printing apparatus 11 or the image processing apparatus 12. In this case, the capacity of the temporary data generated due to performing the job may be included in the maximum memory use amount of the application.

Without any relation to a user operation, the platform unit 20 may execute an application automatically or periodically. For example, the platform unit 20 periodically transmits information to a separate device or receives a document from a separate device for the outputting through the external interface 125. In this case, the capacity of the temporary data generated due to performing the job may be included in the minimum memory use amount of the application.

The present embodiment may be provided not only as the above application platform, but also as an application for controlling an application platform.

The present embodiment explains an example in which in a case where the direct memory unit 122 has no additional capacity, only one application controls the direct memory unit 122 to be usable by the maximum memory use amount.

The above example is explained as just one example and the number of applications which can use the direct memory unit 122 by the maximum memory use amount may be controlled to be k (plural) pieces. In such a case, the following processes may be executed in the present embodiment.

That is, in the present embodiment, k pieces of the active applications may be controlled to be capable of using the direct memory unit 122 by the maximum memory use amount.

In addition, at the time the platform unit 20 calculates the sum at S403, a sum of the maximum memory use amounts of the k pieces of the applications and the minimum memory use amounts of the applications other than them may be calculated.

In addition, at the time the platform unit 20 calculates the sum at S403, the sum may be calculated as follows. That is, first, at S403 the platform unit 20 selects k pieces of applications in the order of an application having a larger difference between the maximum memory use amount and the minimum memory use amount of the application. In addition, at S403 the platform unit 20 may calculate the sum of the maximum memory use amounts of the k pieces of the applications and the minimum memory use amounts of the applications other than them.

For example, there exist the following applications 1 to 3. In this case, in the application 1, the maximum memory use amount is assumed as 10 and the minimum memory use amount is assumed as 0. In the application 2, the maximum memory use amount is assumed as 10 and the minimum memory use amount is assumed as 1. In the application 3, the maximum memory use amount is assumed as 10 and the minimum memory use amount is assumed as 9.

Then, a difference between the maximum memory use amount and the minimum memory use amount of the application 1 is 10−0=10. A difference between the maximum memory use amount and the minimum memory use amount of the application 2 is 10−1=9. A difference between the maximum memory use amount and the minimum memory use amount of the application 3 is 10−9=1.

Then, the application 1 and the application 2 as k=2 pieces are selected in the order of an application having a larger difference between the maximum memory use amount and the minimum memory use amount of the application. At S403 a sum (10+10+9=29) of the maximum memory use amounts of the application 1 and the application 2 as k=2 pieces and the minimum memory use amount of the application other than them is calculated.

The above example is explained as just one example and the number of applications which can use the direct memory unit 122 by the maximum memory use amount may be a variable value. In this case, in the present embodiment the following process may be executed to determine a value of k.

First, k is set to "N (N is a total number of applications)−1". K pieces of applications are selected in the order of an application having a larger difference between the maximum memory use amount and the minimum memory use amount of the application. In addition, an addition of the maximum memory use amounts of the selected k pieces of the applications and the minimum memory use amount of the remaining application other than them is calculated to form a sum. In a case where this sum exceeds the capacity, k is set to "N−2". The above process is repeated until the calculated sum reaches to less than the capacity, thus determining k.

For example, there exist the following applications 1 to 3. In this case, in the application 1, the maximum memory use amount is assumed as 10 and the minimum memory use amount is assumed as 0. In the application 2, the maximum memory use amount is assumed as 10 and the minimum memory use amount is assumed as 1. In the application 3, the maximum memory use amount is assumed as 10 and the minimum memory use amount is assumed as 9. N (total number of applications)=3.

Then, a difference between the maximum memory use amount and the minimum memory use amount of the application 1 is 10−0=10. A difference between the maximum memory use amount and the minimum memory use amount of the application 2 is 10−1=9. A difference between the maximum memory use amount and the minimum memory use amount of the application 3 is 10−9=1.

Then, first, the application 1 and the application 2 as k=N−1=3−1=2 pieces are selected in the order of an application having a larger difference between the maximum memory use amount and the minimum memory use amount of the application. At S403 a sum (10+10+9=29) of the maximum memory use amounts of the application 1 and the application 2 as k=2 pieces and the minimum memory use amount of the application 3 other than them is calculated. In a case where this sum (=29) exceeds the capacity, the application 1 in which a difference between the maximum memory use amount and the minimum memory use amount of k=N−2=3−2=1 piece is the largest is selected. At S403 a sum (10+1+9=20) of the maximum memory use amount of the application 1 as k=1 piece and the minimum memory use amounts of the application 2 and the application 3 other than that is calculated. In a case where this sum (=20) does not exceed the capacity (less than the capacity), k is determined to be 1.

Second Embodiment

According to the first embodiment, in a case where the sum of the maximum memory use amounts of applications as installation targets exceeds the memory usable in the platform unit 20 at the time of installing the application, the following process is performed. That is, it is determined whether or not the application is installed in consideration of the minimum memory use amount.

In the present embodiment, there will be explained an example where not at the time of installing an application, but at the time of activating the application, it is determined whether or not the application is activated in consideration of the minimum memory use amount of the application as an activation target.

Figure 6:
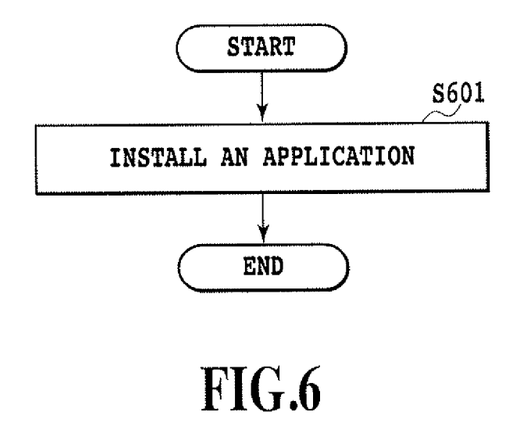
FIG. 6 is a flow chart showing the process order.

FIG. 6 is a flow chart showing the process order at the time the platform unit 20 installs an application.

Figure 7:
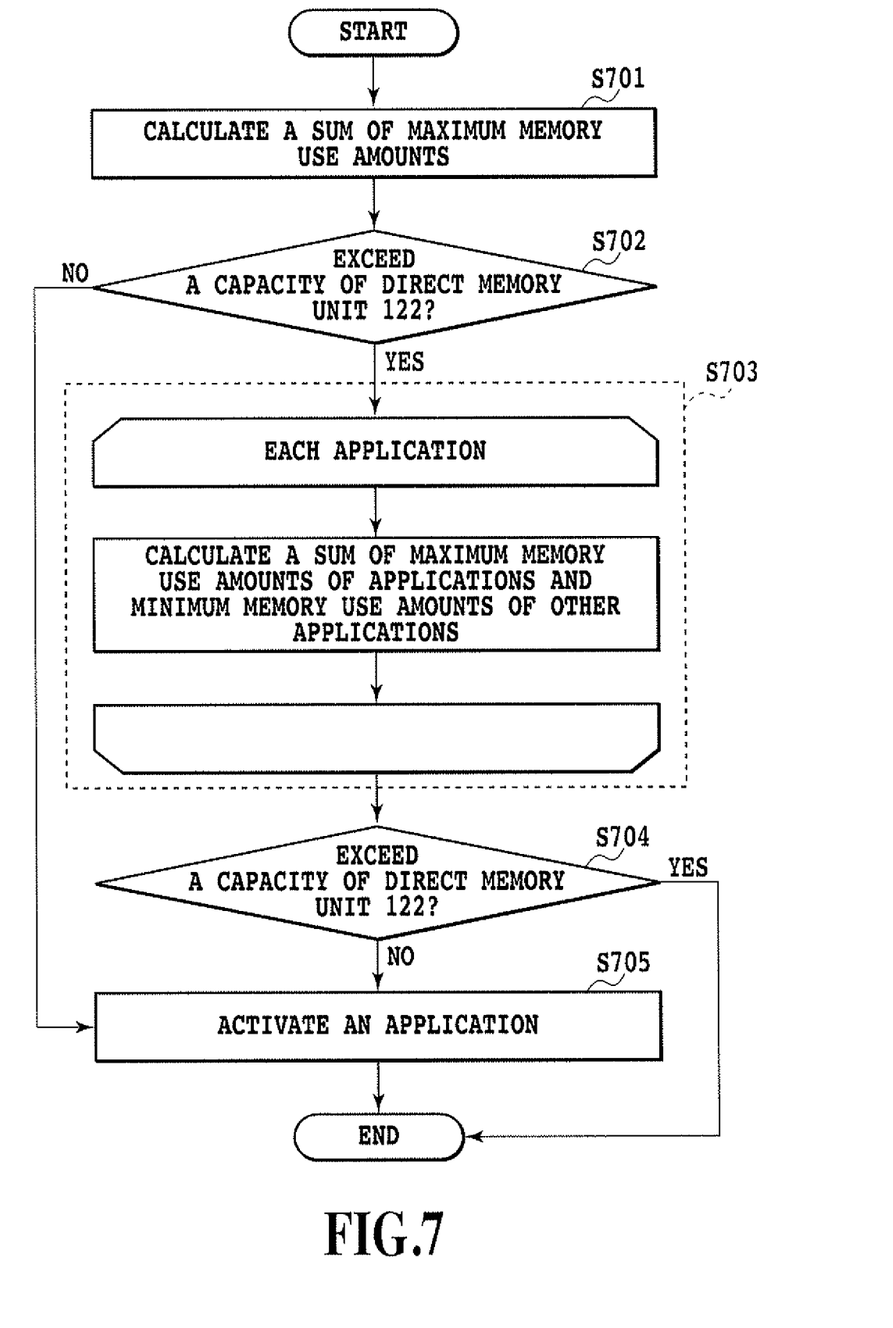
FIG. 7 is a flow chart showing the process order.

S601 in FIG. 6 is the same as the process at S405 shown in FIG. 4. FIG. 7 is a flow chart showing the process order at the time the platform unit 20 activates an application.

When the user interface 124 receives an activation instruction of an application, the user interface 124 informs the platform unit 20 of the activation instruction. Thereby the platform unit 20 executes the following processes.

First, the platform unit 20 calculates a sum of the maximum memory use amounts of an application in which the data item 303 in the application management data 300 is "activate" and an application which intends to be activated (application as an activation target) (S701).

Next, the platform unit 20 determines whether or not the sum calculated at S701 exceeds the capacity of the direct memory unit 122 usable in the platform unit 20 (S702).

When it is determined at S702 that the sum of the maximum memory use amounts calculated at S701 exceeds the capacity of the direct memory unit 122 usable in the platform unit 20, the process goes to S703.

On the other hand, when it is determined at S702 that the sum of the maximum memory use amounts calculated at S701 does not exceed the capacity of the direct memory unit 122 usable in the platform unit 20, the process goes to S705. The platform unit 20 stores this determination result at S702 in the direct memory unit 122.

The platform unit 20 calculates the following value in regard to each of the application in which the data item 303 of the application management data 300 is "activate" and the application which intends to be activated (S703). That is, the platform unit 20 calculates a sum of the maximum memory use amount of some application and the minimum memory use amount of an application other than the above application. Here, the sum calculated at S703 may be calculated in the same way as the sum calculated at S403 in FIG. 4.

The platform unit 20 determines whether or not the maximum value among the sums calculated at S703 exceeds the capacity of the direct memory unit 122 (total memory amount) usable at the platform unit 20 (S704).

When the platform unit 20 determines at S704 that the maximum value among the sums calculated at S703 exceeds the capacity of the direct memory unit 122 usable at the platform unit 20, the process ends without activating the corresponding application.

On the other hand, when the platform unit 20 determines at S704 that the maximum value among the sums calculated at S703 does not exceed the capacity of the direct memory unit 122 usable at the platform unit 20, the process goes to S705.

Next, the platform unit 20 activates the corresponding application (S705).

In this way, according to the present embodiment, the limitation to the application installation due to the memory capacity is carried out at the time of activating the application.

The application installed by the platform unit 20 is stored in the indirect memory unit 123. The indirect memory unit 123 can be realized by HDD or the like and at low costs, and can have a much larger capacity as compared to that of the direct memory unit 122. Therefore, the limitation to the application installation due to the memory capacity can be carried out not at the time of installing the application, but at the time of activating the application.

At the time of operating an device, the communication of the device with a separate device through the external interface 125 may not be regularly made. For example, at the time of initially setting a device, the process to the installation of applications is in advance executed and, after carrying out an increase of the memory capacity, the application may be activated. Since the job of installing the communication unit at each time can be eliminated, convenience on the operation of the device can be improved.

According to the processes shown in FIG. 4 and FIG. 7, it can be determined whether the application as the installation target or the activation target is installed or activated at the application platform of the application. In addition, according to the processes shown in FIG. 4 and FIG. 7, the platform unit 20 can execute the following process at the time of determining the application of the installation target or the activation target. That is, the platform unit 20 can refer to the maximum memory use amount and the minimum memory use amount of each of the plural applications already installed or activated. Further, the platform unit 20 can refer to the maximum memory use amount and the minimum memory use amount of the application as the installation target or the activation target. Here, in general the maximum memory use amount of the application as the installation target or the activation target is larger than the minimum memory use amount of the application as the installation target or the activation target.

In addition, according to the processes shown in FIG. 4 and FIG. 7, the platform unit 20 can execute the following process at the time of determining the application of the installation target or the activation target. That is, the platform unit 20 can refer to the maximum memory use amount and the minimum memory use amount of each of N−1 pieces of the plural applications already installed or activated. Further, at this time the platform unit 20 can refer to the maximum memory use amount and the minimum memory use amount of one piece of the application as the installation target or the activation target. Then the platform unit 20 can execute the following process. That is, the platform unit 20 can determine whether or not an addition of a sum of the maximum memory use amounts of k pieces of applications and a sum of the minimum memory use amounts of N−k pieces of applications exceeds a threshold value among N (=(N−1)+1) pieces of applications in total. Here, the threshold value is a resource amount which N pieces of applications can use at the platform unit 20.

In addition, at the platform unit 20 according to the present invention, the application which can be installed or activated can declare the maximum memory use amount and the minimum memory use amount.

In addition, at the platform unit 20 according to the present invention, the maximum memory use amount of the application which can be installed or activated may be larger than the minimum memory use amount of the application which can be installed or activated. In addition, at the platform unit 20 according to the present invention, a resource for the maximum memory use amount of the application which can be installed or activated may be the same as a resource for the minimum memory use amount of the application which can be installed or activated.

In addition, at the platform unit 20 according to the present invention, the maximum memory use amount of the application which can be installed or activated may be an amount of a resource used when the application is in a consumption possible state of the maximum memory use amount.

In addition, at the platform unit 20 according to the present invention, the minimum memory use amount of the application which can be installed or activated may be an amount of a resource used when the application is in a consumption state of the minimum memory use amount.

Third Embodiment

In the aforementioned first embodiment, at S504 in FIG. 5, GUI data of an application transferring to the consumption state of the minimum memory use amount are deleted from the direct memory unit 122. In consequence, it is possible to further increase a vacant capacity of the direct memory unit 122. However, in a case of once more making the application to the consumption possible state of the maximum memory use amount (active state), a screen of an initial state of the application is displayed in the user interface 129.

In the present embodiment, the GUI data to be deleted when the application transfers to the consumption state of the minimum memory use amount are stored and in a case where the application returns to the consumption possible state of the maximum memory use amount, a screen display in the user interface 124 is recovered.

Figure 8:
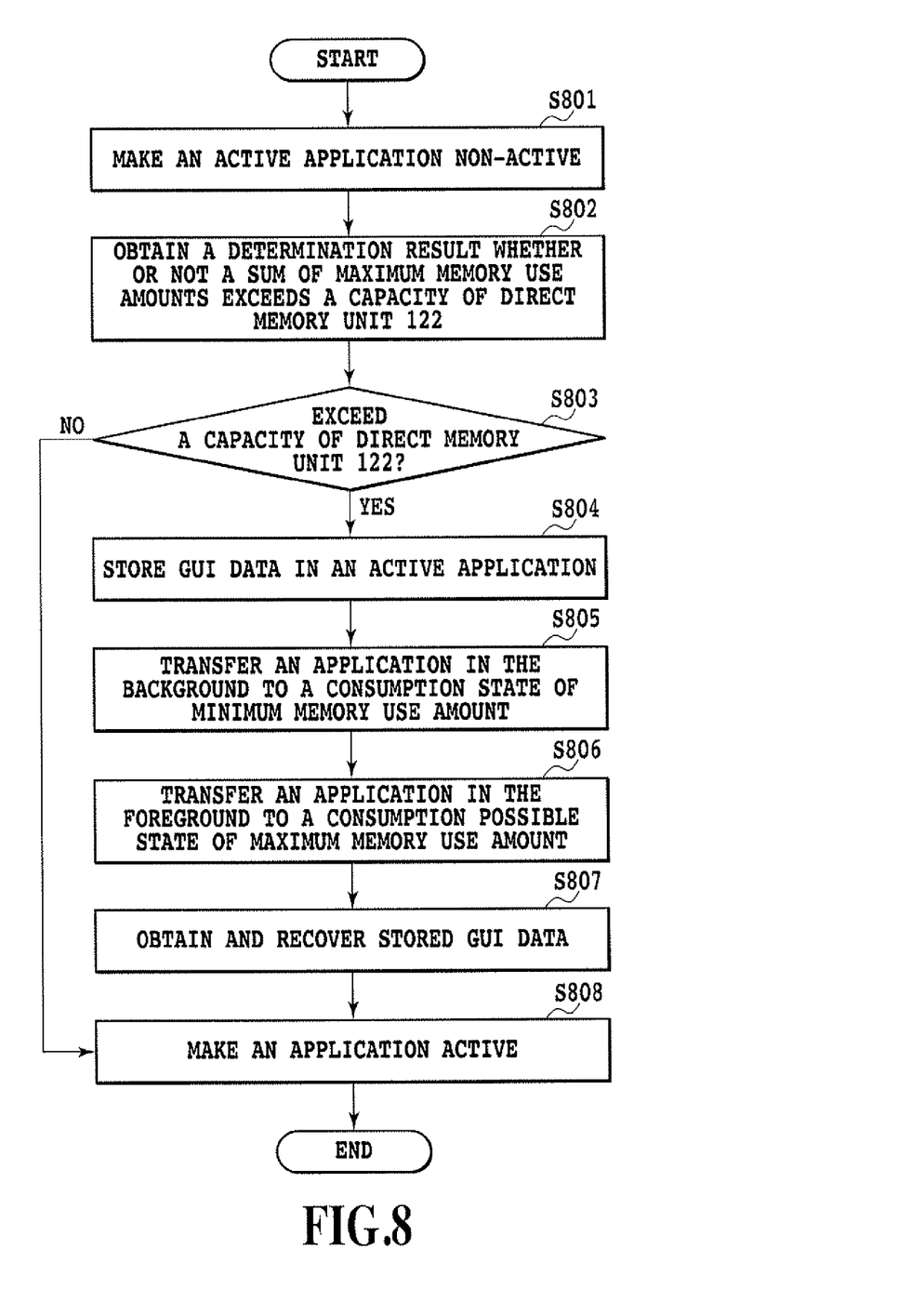
FIG. 8 is a flow chart showing the process order.

FIG. 8 is a flow chart showing the process order of the platform unit 20 at the time of switching an active application.

S801 and S501, S802 and S502, S803 and S503, S805 and S504, S806 and S505, and S808 and S506 respectively are the same process. However, at S805 the GUI data of an application transferring to the consumption state of the minimum memory use amount are deleted from the direct memory unit 122.

The platform unit 20 obtains the GUI data of the application transferring from the consumption possible state of the maximum memory use amount to the consumption state of the minimum memory use amount from the direct memory unit 122, which are then stored in the indirect memory unit 123 (S804). At this time, a location in the indirect memory unit 123 where the GUI data are stored (storage location of the GUI data) is stored in the direct memory unit 122. Here, the GUI data are data including a content shown by GUI and a content set by GUI.

The platform unit 20 executes the following process in regard to the application transferring from the consumption state of the minimum memory use amount to the consumption possible state of the maximum memory use amount. That is, the platform unit 20 obtains the GUI data from the indirect memory unit 123 based upon the storage location of the GUI data stored in the direct memory unit 122 (S807). In addition, the GUI data are stored in the direct memory unit 122, which are recovered.

In this way, according to the present embodiment, at the time of transferring the application to the consumption state of the minimum memory use amount, even if the GUI data in the application are deleted, in a case where the application once more transfers to the consumption possible state of the maximum memory use amount, the GUI data can be recovered to the original state. In consequence, the memory can be efficiently used without deteriorating user's convenience.

It should be noted that in a device capable of performing the authentication management as in the case of a MFP, when a log-out of a user occurs, the GUI data of each application stored in the indirect memory unit 123 may be also deleted.

This prevents a screen (GUI data) generated by operating the user interface 124 by the user from being seen by the other user.

Fourth Embodiment

In the aforementioned first embodiment, the capacity for storing the temporary data generated by performing the job with the printing apparatus 11 or the image processing apparatus 12 is not included in the maximum memory use amount or the minimum memory use amount.

In the present embodiment, the temporary data generated due to performing the job are included in the maximum memory use amount or the minimum memory use amount in the application.

When the platform unit 20 receives a start instruction of the job from a user through the user interface 124, the platform unit 20 executes the application, issuing the job to the printing apparatus 11 or the image processing apparatus 12. In this case, the capacity of the temporary data generated due to performing the job is included in the maximum memory use amount in the application.

Without any relation to a user operation, the platform unit 20 may execute an application automatically or periodically. For example, the plat form unit 20 periodically transmits information to a separate device or receives a document from a separate device for the outputting through the external interface 125. In this case, the capacity of the temporary data generated due to performing the job may be included in the minimum memory use amount of the application.

It should be noted that in the aforementioned embodiment, for distinguishing a resource use amount of the maximum memory use amount from that of the minimum memory use amount, the maximum memory use amount or the minimum memory use amount may be called "a first resource use amount" or "a second resource use amount".

In the aforementioned embodiment, the first resource use amount may be an amount of a resource used when the application is in a first state, and the second resource use amount may be an amount of a resource used when the application is in a second state.

In the aforementioned embodiment, for distinguishing a plurality of transfers, "a first transfer" or "a second transfer" may be called.

In the aforementioned embodiment, N or k is an arbitrary integer in the description of "N pieces", "N−1 pieces", "k pieces" or the like.

Other Embodiments

The present invention may be further applied to a system comprising a plurality of devices (for example, a computer, an interface device, a reader, a printer and the like) or an apparatus comprising one device (a MFP, a printer, a facsimile device or the like).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-289887 filed Nov. 12, 2008, which is hereby incorporated by reference herein in its entirety.

What is claimed is:

1. A printer, comprising:
a determining unit configured to determine whether or not a sum of maximum memory use amount of a plurality of installed applications exceeds a capacity of a work memory in the printer, in response to an inactive application being selected by a user through a user interface on which an application screen of an active application is displayed; and
a transferring unit configured to transfer the plurality of installed applications to a consumption possible state of maximum memory use amount when the sum of maximum memory use amount does not exceed the capacity of the work memory in the printer,
wherein the transferring unit transfers, after data of the application screen of the active application is stored in an external memory, i) the selected application to a consumption possible state of maximum memory use amount and ii) the other applications to a consumption state of the minimum memory use amount when the sum of maximum memory use amount exceeds the capacity of the work memory in the printer, and
wherein the transferring unit obtains the application screen data from the external memory to display the obtained application screen on the user interface when an application corresponding to the application screen displayed on the user interface firstly is transferred to a consumption possible state of maximum memory use amount; and
a deleting unit configured to delete the application screen data from the external memory on a condition that a log-out of a user from the printer occurs in a case where the application screen data is stored in the external memory.

2. A method used for a printer, the method comprising:
determining whether or not a sum of maximum memory use amount of a plurality of installed applications exceeds a capacity of a work memory in the printer, in response to an inactive application being selected by a user through a user interface on which an application screen of an active application is displayed;
transferring the plurality of installed applications to a consumption possible state of maximum memory use amount when the sum of maximum memory use amount does not exceed the capacity of the work memory in the printer,
wherein in the transferring step, transferring, after data of the application screen of the active application is stored in an external memory, i) the selected application to a consumption possible state of maximum memory use amount and ii) the other applications to a consumption state of the minimum memory use amount when the sum of maximum memory use amount exceeds the capacity of the work memory in the printer, and
wherein in the transferring step, obtaining the application screen data from the external memory to display the obtained application screen on the user interface when an application corresponding to the application screen displayed on the user interface firstly is transferred to a consumption possible state of maximum memory use amount; and deleting the application screen data from the external memory on a condition that a log-out of a user from the printer occurs in a case where the application screen data is stored in the external memory.

3. A non-transitory computer readable storage medium storing a program causing a computer to execute the method of claim 2.

* * * * *